United States Patent Office 3,085,078
Patented Apr. 9, 1963

3,085,078
ESTER OF A DICARBOXYLIC ACID AND VINYL CHLORIDE RESIN PLASTICIZED THEREWITH
Joseph Fath, Barrington, R.I., assignor to Thompson Chemical Company, Pawtucket, R.I., a corporation of Rhode Island
No Drawing. Filed Oct. 22, 1958, Ser. No. 768,841
8 Claims. (Cl. 260—31.4)

This invention relates to plasticized vinyl resins and to novel plasticizers to be incorporated therein. More particularly, the invention concerns new organic dicarboxylic acid esters of hydrocarbon substituted aryloxyethanols, and vinyl resins plasticized therewith.

Ester type plasticizers are extensively used in conjunction with vinyl resins in order to impart to end products made from such resins requisite properties of flexibility, low volatility, color and heat stability, and toughness. In this way the usefulness of vinyl resins has been expanded to a point where they have found wide application in a variety of commercial products, including, for example, electrical insulation coatings for wire, floor tile, calendered sheeting, upholstery film, draperies, protective coverings, profile extrusion for welting, coving, gaskets, injection molded compounds for plugs, toys, machine parts, decorative finishes, and many other applications. The plasticizers which have heretofore found largest volume use in vinyl resins have been esters of aliphatic alcohols with dibasic organic acids such as phthalic, sebacic, and adipic acids.

Experience has shown that the known plasticizers possess numerous shortcomings, particularly in specialized applications, which limit their utility, and this has led the art to seek alternatives. For example, phthalate plasticizers, such as dioctyl phthalate, exhibit poor aging characteristics under conditions of extreme heat such as are found in wire insulation service, tending to volatilize with attendant loss of weight of the resinous material. Moreover, in applications where vinyl compositions are exposed to solvent cleaning or solvent coatings such as in the case of flooring, waxes, and the like, the commonly used plasticizers are very often not sufficiently resistant to extraction by solvents, with resultant marring of the surface and reduced life of the vinyl resin article.

Efforts have been made in the past to avoid these tendencies by increasing the molecular weight of ester type plasticizers, such as for example the phthalates, using for the esterification, aliphatic alcohols of increased chain length. It has been found, however, that both in the case of the phthalate esters and of analogous dialkyl esters of other dibasic acids such as the sebacates, adipates, azelates, and the hexahydrophthalates, increased chain length of the esterifying alcohol results in incompatibility manifesting itself in the form of immediate or ultimate bleeding or spewing, i.e. separation of the plasticizer from the resin composition. Known ester plasticizers have, moreover, frequently exhibited a low degree of tolerance for secondary or extender type plasticizers which although they may themselves be incompatible with the vinyl resin, are often desirable to add for reasons of economy in low cost resin applications.

In accordance with the present invention, ester type plasticizers for vinyl resins are provided which are comparatively free from the foregoing shortcomings. The new vinyl resin plasticizers of this invention are prepared by the esterification of an organic dicarboxylic acid with at least one mole of a hydrocarbon substituted aryloxyethanol. If two moles of the same hydrocarbon substituted aryloxyethanol are used in the esterification, a diester is obtained. If however, a mixed ester is to be prepared, the other esterifying alcohol may be an aliphatic alcohol, an alkoxyethanol, or an alkylthioethanol, a different hydrocarbon substituted aryloxyethanol, or an unsubstituted aryloxyethanol.

Advantageously the novel esters of this invention are esters of organic dicarboxylic acids with hydrocarbon substituted phenoxyethanols, which may be represented by the following general formula:

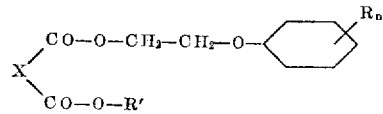

wherein R is a hydrocarbon radical selected from the group consisting of alkyl, aralkyl, aryl and cycloalkyl radicals, $n$ is an integer from 1 to 3, R' is a member of the group consisting of alkyl, alkoxyethyl, alkylthioethyl, aryloxyethyl, aralkyl, cycloalkyl, and

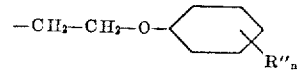

wherein R" is a hydrocarbon radical selected from the group consisting of alkyl having at least 2 carbon atoms, aralkyl, aryl, and cycloalkyl, and X is a member of the group consisting of alkylene, alkenylene, cycloalkylene, cycloalkenylene, and phenylene.

The novel plasticizer esters of this invention may be prepared by heating a mixture of the dicarboxylic acid or the dicarboxylic acid anhydride and an aryloxyethanol of the type indicated. To prepare the mixed ester, approximately one mole of the aryloxyethanol is first added, and a half-ester is first formed, in the absence of a catalyst. The other esterifying alcohol is then added to the mixture along with the esterification catalyst and the reaction is continued until esterification is complete. Where the diester of the aryloxyethanol is to be prepared, the esterification is carried out using two moles of the aryloxyethanol, in the presence of a suitable esterification catalyst. Suitable esterification catalysts for both types of esterification are, for example, sulfuric acid or para-toluene sulfonic acid. The esterification reactants are employed in molar quantities, but a slight excess of the alcohol may be used where desired. Furthermore, the esterification can be conducted in the presence of an organic solvent such as benzene or toluene, to aid in removal of water of esterification from the reaction mixture. Unreacted acid or catalyst is neutralized and the solvent removed in accordance with conventional procedures.

Mixed esters of organic dicarboxylic acids within the contemplation of the invention are particularly those having the general formula:

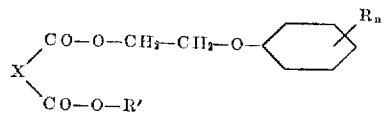

wherein R is a hydrocarbon radical selected from the group consisting of alkyl, aralkyl, aryl, and cycloalkyl radicals, $n$ is an integer from 1 to 3, R' is alkyl, and X is a member of the group consisting of alkylene, alkenylene, cycloalkylene, cycloalkenylene, and phenylene.

Esters within contemplation of this invention which are derived from two moles of aryloxyethanols are particularly those having the general formula:

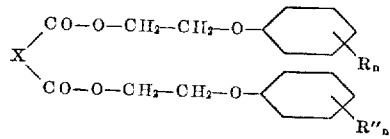

wherein R is a hydrocarbon radical selected from the group consisting of alkyl, aralkyl, aryl, and cycloalkyl radicals, $n$ is an integer from 1 to 3, R" is a hydrocarbon radical selected from the group consisting of alkyl having at least 2 carbon atoms, aralkyl, aryl, and cycloalkyl, and X is a member of the group consisting of alkylene, alkenylene, cycloalkylene, cycloalkenylene, and phenylene.

The organic dicarboxylic acids which may be used to prepare the novel esters of this invention include saturated aliphatic dicarboxylic acids, as well as also aromatic and hydrogenated aromatic dicarboxylic acids. The anhydrides of these types of acids may also be employed for this purpose.

Thus, in accordance with the invention, I may employ a variety of saturated aliphatic dicarboxylic acids, and advantageously those acids which contain from 3 to 10 carbon atoms, such as, for example, malonic acid, succinic acid, glutaric acid, 3-ethylglutaric acid, adipic acid, azelaic acid, sebacic acid, and isosebacic acid. Where convenient, the anhydrides of these acids may be used, such as, for example, succinic anhydride and glutaric anhydride.

I may also employ for esterification, aromatic and hydrogenated aromatic dicarboxylic acids and their anhydrides, including, for example, phthalic acid, phthalic anhydride, terephthalic acid, isophthalic acid, tetrahydrophthalic anhydride, hexahydrophthalic anhydride, methylendomethylene tetrahydrophthalic anhydride, and alkylcyclohexene dicarboxylic acids, such as 3-methyl-4-cyclohexene-1,2-dicarboxylic acid, and 4-amyl-4-cyclohexene-1,2-dicarboxylic acid. In addition, I may also use 4,5-epoxycyclohexane-1,2-dicarboxylic acids of the type disclosed in U.S. Patent 2,794,030, to form esters with aryloxyethanols in accordance with this invention.

The hydrocarbon substituted aryloxyethanols used in the preparation of the novel esters of this invention may be prepared in accordance with known methods by reacting hydrocarbon substituted phenols with ethylene oxide to convert them to primary alcohols. Preferably there are employed for esterification hydrocarbon substituded phenoxy ethanols of the formula:

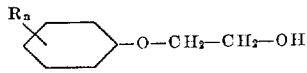

wherein R is a hydrocarbon radical selected from the group consisting of alkyl, aralkyl, aryl, and cycloalkyl radicals and $n$ is an integer from 1 to 3. Examples of suitable hydrocarbon substituents which may be present in the benzene nucleus include alkyl radicals having from 1 to 18 carbon atoms, such as methyl, ethyl, propyl, isopropyl, n-butyl, isobutyl, sec.-butyl, di-isobutyl, n-amyl, isoamyl, tert.-amyl, hexyl, octyl, nonyl, dodecyl, pentadecyl and stearyl radicals. Aralkyl hydrocarbon substituent radicals include for example, benzyl, phenethyl and phenyl isopropyl radicals. Examples of aryl hydrocarbon radicals include phenyl, tolyl, xylenyl, cumyl, $\alpha$- and $\beta$-napthyl radicals, while examples of cycloalkyl hydrocarbon radicals include cyclopentyl, cyclohexyl, methylcyclohexyl and dicyclohexyl radicals.

As examples of hydrocarbon substituted aryloxy ethanols which may be employed in preparing the novel plasticizers of this invention there are listed:

Xylenoxyethanol [1]
Sec.-butylphenoxyethanol
p-Tert.-butylphenoxyethanol
Amylphenoxyethanol
Octylphenoxyethanol
Nonylphenoxyethanol
Di-sec.-butylphenoxyethanol
Cumylphenoxyethanol
Phenylphenoxyethanol
Phenethylphenoxyethanol

[1] Includes derivatives of ethoxylated cresylic acid which are mixtures of xylenols.

As disclosed previously the aforementioned hydrocarbon substituted aryloxyethanols may be combined with organic dicarboxylic acids together with a molar amount of a different alcohol to form mixed esters. The other esterifying alcohol may be an aliphatic alcohol, advantageously an aliphatic alcohol containing from 1 to 18 carbon atoms but preferably containing from 4 to 18 carbon atoms. Examples of suitable aliphatic alcohols include methyl, ethyl, propyl, butyl, isobutyl, amyl, octyl, iso-octyl, decyl, tridecyl, 2-hexyldecyl, and stearyl alcohols.

Another type of esterifying alcohol which may be used in conjunction with an aryloxyethanol is an alkoxyethanol, such as, for example, butoxyethanol, lauroxyethanol, tridecyloxyethanol, and 2-ethylhexyloxyethanol. Still another type of alcohol which may be employed is an alkylthioethanol, such as, for example, amylmercaptoethanol, octylmercaptoethanol, and dodecylmercaptoethanol.

There may also be used for esterification aralkyl alcohols, such as, for example, benzyl alcohol, phenethyl alcohol and phenylamyl alcohol. There may also be used cycloaliphatic alcohols, such as, for example, cyclohexanol, tridecyloxyethanol, and 2-ethylhexyloxyethanol. The second esterifying alcohol may be an unsubstituted aryloxyethanol, such as, for example, phenoxyethanol or naphthoxyethanol.

The novel diesters of organic dicarboxylic acids obtained in accordance with the present invention include types in which both of the hydrocarbon substituted aryloxyethanols are the same, as well as those in which they are different. Examples of novel esters in which both aryloxyethanol radicals are the same include:

Dixylenoxyethyl adipate
Dixylenoxyethyl phthalate
Dixylenoxyethyl isophthalate
Dixylenoxyethyl isosebacate
Dixylenoxyethyl tetrahydrophthalate
Dixylenoxyethyl hexahydrophthalate
Dixylenoxyethyl glutarate
Dixylenoxyethyl azelate
Di-sec.-butylphenoxyethyl phthalate
Diamylphenoxyethyl phthalate
Dioctylphenoxyethyl adipate Examples of mixed esters in which the aryloxyethanol radicals are specifically different include:

Sec.-butylphenoxyethyl xylenoxyethyl phthalate
Amylphenoxyethyl xylenoxyethyl tetrahydrophthalate
Butylphenoxyethyl amylphenoxyethyl phthalate
Isopropylphenoxyethyl p - tert. - butylphenoxyethyl isophthalate
Nonylphenoxyethyl phenyl phenoxy ethyl tetra hydrophthalate Novel mixed esters prepared in accordance with this invention from dicarboxylic acids, an aryloxyethanol, and a different alcohol include, for example:

Xylenoxyethyl tridecyl phthalate
Xylenoxyethyl 2-hexyldecyl phthalate
Xylenoxyethyl butyl phthalate
Xylenoxyethyl iso-octyl phthalate
Nonylphenoxyethyl butyl phthalate
Sec.-butylphenoxyethyl butoxyethyl phthalate
Xylenoxyethyl butoxyethyl adipate
Xylenoxyethyl dodecylmercaptoethyl phthalate
Xylenoxyethyl tridecyloxyethyl phthalate
Xylenoxyethyl lauroxyethyl phthalate
Xylenoxyethyl butoxyethyl phthalate
Xylenoxyethyl n-octyl phthalate
Xylenoxyethyl n-octyl isophthalate
Xylenoxyethyl decyl phthalate
Di-sec.-butylphenoxyethyl butyl phthalate
Cumylphenoxyethyl decyl phthalate
p-Tert.-butyl-phenoxyethyl amyl adipate Amylphenoxyethyl octyl tetrahydrophthalate
Cresoxyethyl decyl isosebacate
Xylenoxyethyl benzyl adipate
Sec.-butylphenoxyethyl cyclohexyl phthalate
Sec.-butylphenoxyethyl phenoxyethyl phthalate The method of preparation of the novel plasticizers of this invention may be illustrated by the following examples, which are, however, not to be regarded as limiting:

EXAMPLE 1

Xylenoxyethyl Iso-Octyl Phthalate 148 grams of phthalic anhydride (1.0 mol) and 166 grams of mixed xylenoxyethanols (1.0 mol) comprised mainly of the 2,3-; 3,4- and 3,5-isomers were heated with agitation to 120° C. for 2 hours in the presence of 50 cc. benzene. At the end of this time 139 grams isooctyl alcohol (1.07 mols) 50 cc. benzene and 2.1 g. paratoluenesulfonic acid were added to the reaction mixture. The solution was refluxed at 125–145° C. while constantly eliminating water until 18 cc. water had been given off. At this point, the acid value of the solution was found to be 2.5. The solution was cooled to 80° C. and 150 grams of a 3% sodium hydroxide solution were added with agitation. The mixture was permitted to settle and the aqueous layer was withdrawn from the upper, organic layer. The organic layer was washed three times with water at 80° C. The water was withdrawn each time and discarded. The organic layer was stripped under vacuum at temperatures up to 130° C. to remove benzene. When all the benzene had been removed, steam was introduced under a vacuum of 80 mm. to remove small amounts of excess alcohol. At the end of one hour the solution was permitted to dry and was clarified by filtration. 419 grams, xylenoxyethyl isooctyl phthalate were obtained representing a yield of 96%. The compound is an amber liquid having a specific gravity of 1.065 at 25° C., an acid value of 0.03, a refractive index of 1.5194 and a Gardner color of 5.

EXAMPLE 2

Nonylphenoxyethyl Butyl Phthalate

To 148 grams of phthalic anhydride (1.0 mol) were added 264 grams of nonylphenoxyethanol (1.0 mol). The reactants were fused and maintained at a temperature of 130° C. for 3 hours to form the half-ester nonylphenoxyethyl acid phthalate. There were then added 85 grams of n-butanol (1.15 mols), 50 cc. benzene and 2.8 g. 50% sulfuric acid. The reaction mixture was refluxed at 120–150° C. in a reaction vessel equipped with a Dean-Stark tube. When 18 cc. water had been collected the acid value was determined and found to be 3.5. The mixture was cooled to 75° C. under a blanket of nitrogen gas to prevent deterioration of color. It was then neutralized by addition of 100 grams of a 5% sodium hydroxide solution at 75° C. followed by two water washes at approximately the same temperature. The washed organic layer was then dried under vacuum up to 140° C. to remove water, benzene and a small amount of residual butanol. The product was filtered and yielded 445 grams (95% of theoretical) of nonylphenoxyethyl butyl phthalate having a specific gravity of 1.045 at 25° C., a refractive index of 1.5133 at 25° C., an acid value of 0.08 and a Gardner color of 2.

EXAMPLE 3

Dixylenoxyethyl Adipate 697 grams of mixed xylenoxyethanols (4.20 mols) derived from a mixed xylenol fraction boiling from 210–218° C., 292 g. adipic acid (2.0 mols), 150 cc. toluene and 4.5 g. p-toluene-sulfonic acid were charged into a reaction flask equipped with agitator, thermometer, Dean-Stark trap, reflux condenser and a gas sparging tube. While introducing nitrogen, the temperature was raised to 120° C. where reflux was obtained. Introduction of nitrogen was discontinued and a total of 72 cc. water was collected at temperatures between 125–165° C. At the end of this time an acid value of 5 was obtained. The solution was cooled to 80° C. while introducing nitrogen and neutralized with 300 cc. 5% sodium hydroxide. The organic layer was washed with water until neutral, placed under vacuum and steam stripped to remove excess xylenoxyethanol. It was then treated with 4 grams activated charcoal for ½ hour at 80° C. and filtered at this temperature. 866 grams dixylenoxyethyl adipate were obtained (98% yield) having a specific gravity of 1.106 at 25° C., a refractive index of 1.5233, an acid value of 0.18 and a Gardner color of 6–7.

EXAMPLE 4

Sec.-Butylphenoxyethyl Butoxyethyl Tetrahydrophthalate 152 grams of tetrahydrophthalic anhydride (1.0 mol) were reacted with 194 grams sec.-butylphenoxyethanol at 110° C. to form sec. butylphenoxyethyl acid tetrahydrophthalate. To this product were added 130 grams butoxyethanol, 6 grams 85% phosphoric acid and 100 grams benzene. The mixture was refluxed until esterification was complete, neutralized with a 300% excess of 5% sodium carbonate solution and washed with water until the water was no longer alkaline. The oil layer was stripped under vacuum to remove solvent and vacuum steam stripped to remove traces of non-ester constituents. Upon filtration 423 grams (95% of theory) of sec. butylphenoxyethyl butoxyethyl tetrahydrophthalate were obtained.

The novel plasticizer esters of this invention may be used to plasticize vinyl resins of all types, both as primary plasticizers and in association with secondary plasticizers.

Vinyl resins thus plasticized may be used to produce plastic compositions having outstanding properties of permanence, low volatility, and resistance to the action of organic solvents. They are characterized by unusual ease of processing at high temperatures and unusually good aging properties under conditions of extreme heat, which make them especially valuable for use in connection with wire insulation, and permit the production of compositions ranging in flexibility from very soft to very rigid. Thus for example, the plasticizers of this invention are much superior to known plasticizers such as dioctyl phthalate in insulation service, since as may be seen from Example 5, below, when aged at a test temperature of 136° C. for 7 days a weight loss of only 2.6 percent was noted, in contrast to a weight loss in excess of 2.5 percent for dioctyl phthalate. Thus, the esters of this invention provide for the first time, plasticizers for this high temperature application which are not only superior in their overall properties, but which do not have the adverse characteristics of excess viscosity, difficulty of processing, low insulation value, and high cost possessed by the presently used plasticizers.

In comparison with known vinyl resin plasticizers, the novel plasticizers of this invention confer superior resistance to staining and to extraction by organic solvents upon vinyl resin compositions in which they are incorporated. Thus, for example, in applications such as vinyl tile flooring where such compositions are exposed to solvent cleaning or solvent containing coatings, such as waxes, cleaning fluids, and the like, the commonly used plasticizers lack such resistance, thereby reducing the life of the vinyl resin composition. The outstanding properties of the plasticizers of this invention in this regard make possible longer life of the vinyl resin article, with greatly diminished solvent marring, staining, and dirt absorption.

Vinyl resin articles made with the new plasticizers can be produced to be more rigid, harder, and more resistant to impact than those made with conventional plasticizers, while at the same time they possess the advantage of being producible under substantially the same conditions as those found in the production of more malleable, softer and more flexible end products. For example, in working with polyvinyl chloride the processing of the desired article is often difficult when relatively stiff, rigid goods are desired. Several of the plasticizers of this invention have the unusual property of imparting excellent fluidity to the vinyl resin composition during processing at high temperatures while at the same time permitting the formation of essentially rigid masses upon cooling. These plasticizers also permit the processing of high molecular weight vinyl resins, when added to such resins in minor amounts, such as, for example, from 3 to 10 parts by weight, whereas heretofore it has only been possible to utilize low molecular weight resins to achieve equivalent processing results. The use of high molecular weight resins has the advantage of imparting greater tensile strength and impact resistance to the finished vinyl resin article.

Another advantage of the novel plasticizers of this invention is their improved tolerance for low cost secondary or extender plasticizers of other types such as are commonly used in vinyl resin formulation. Since such extenders are often used to lower the cost of the resin composition, the high degree of tolerance of the novel plasticizers disclosed herein toward such extender plasticizers makes possible new and greater economies in vinyl resin processing. This improved tolerance is thought to be attributable to the good solvating action exhibited by the new plasticizers, thereby permitting lower fusion temperatures of the vinyl composition, increased speeds of calendering and extrusion, smoother and more glossy extrusions, higher filler tolerance, and an ability to facilitate the incorporation of other plasticizers which may fuse with greater difficulty and which require special resins and processing techniques. Thus, for example, a high molecular weight polymeric plasticizer may require a costly polyvinyl chloride-acetate copolymer for processing, whereas the novel plasticizers of this invention require only ordinary, less costly, unmodified polyvinyl chloride resins.

The novel plasticizers of this invention also exhibit substantially full compatibility with vinyl resins, being substantially free from immediate or ultimate spewing or bleeding, i.e. separation of plasticizer from the vinyl composition. They provide a higher molecular weight plasticizer which is free from the shortcomings in this respect of other known types of high molecular weight plasticizers.

The vinyl resins with which the novel plasticizers of this invention are suitable for use include those obtained by polymerization or copolymerization of vinyl monomers generally, such as, for example, vinyl esters, vinyl ethers, vinylidene esters, acrylonitrile, and esters of acrylic and methacrylic acids. Vinyl resins to which the invention is especially well suited are those obtained from polyvinyl halides, such as unmodified polyvinyl chloride resins, of all molecular weights, or copolymers thereof with vinyl esters, such as vinyl acetate, or with esters of acrylic acid, such as ethyl acrylate, or with butyl maleate, or with higher vinyl ethers, vinylidene chloride, acrylonitrile, and the like. However, the plasticizers may also be used in conjunction with other individual vinyl polymers or mixtures thereof, including, for example, polyvinyl alcohol, polyvinyl acetate, polyvinyl butyral, polyvinyl formal, polyvinyl isobutyl ether, polyvinyl methyl ether, polyvinyl bromide, polyvinylidene chloride, polyethyl acrylate, methyl acrylate, and methyl methacrylate.

Utilizing the novel plasticizers of this invention, vinyl resin compositions can be prepared with a wide range of physical properties, depending upon the proportion of plasticizer used. In accordance with the present invention, the proportion of plasticizer added may vary widely, ranging from about 3 parts to about 200 parts of plasticizer by weight to 100 parts the resin content (3 to 200%). Preferably, the proportion of plasticizer added will range from 5 to 150 percent by weight of the resin. The new plasticizers can either be used as such, or they can be formulated together with other types of plasticizers, such as, for example, epoxidized fatty acid esters, polymeric plasticizers, phthalate esters, adipic acid esters, hydrocarbons, and numerous other types commonly used in this art.

The vinyl resin compositions can be compounded further with commonly used stabilizers such as dibasic lead silicate, carbonate, sulfate, phthalate, or phosphite, or barium-cadmium octoate, laurate, or ricinoleate, zinc stearate, calcium stearate, and other metallic soaps. Auxiliary stabilizers may be similarly employed, such as, for example, organic phosphites, phenols, pentaerythritol, and others. The compositions may also contain the commonly used fillers and pigments, such as clays, calcium carbonate, silicates, barytes, and the like, for enhanced appearance.

The following examples serve to illustrate the method of incorporating the new plasticizers into vinyl resin composition and the improved properties resulting therefrom, but are not to be regarded as limiting in any way.

EXAMPLE 5

Xylenoxyethyl tridecyl phthalate, prepared by the method outlined in Example 1, was incorporated into a vinyl composition as follows:

100 parts of a high molecular weight, unmodified polyvinyl chloride resin marketed as "Trulon 500," were mixed with 60 parts xylenoxyethyl tridecyl phthalate, 5 parts dibasic lead phthalate, 5 parts dibasic lead phosphite, 15 parts of an electrical grade clay and 0.2 part mineral oil. The composition was milled on a two roll, differential speed rolling mill at 325° F. for 10 minutes. A smooth, flexible sheet was obtained having the following physical properties as determined by standard ASTM methods:

Ultimate tensile strength_____p.s.i__ 2700
Modulus, 100% elongation_____p.s.i__ 2060
Ultimate elongation_____percent__ 280
Brittle point (ASTM D746-55T)_____C__ -6°

A specimen cut from the sheet with a type "C" dumbbell die as specified in ASTM D412-51T was aged in a mechanical convection oven for 7 days at 136° C. At the end of this time the specimen had incurred a weight loss of 2.6% and had retained an ultimate elongation of 85% of the original amount. A similar specimen prepared with di-2-ethylhexyl phthalate as the plasticizer, became hard, horny and brittle on identical exposure and retained none of its original elongation. The latter specimen incurred a weight loss in excess of 25%.

When comparable specimens were aged in a mechanical convection oven at 100° C., the following weight losses were obtained.

| Aging time, days | Di-2-ethylhexyl phthalate, percent | Xylenoxyethyl tridecyl phthalate, percent |
|---|---|---|
| 1 | | |
| 2 | 0.9 | 0.1 |
| 4 | 1.3 | 0.2 |
| 7 | 2.2 | 0.3 |
| 10 | 6.0 | 0.3 |
| | 6.6 | 0.3 |

EXAMPLE 6

58.5 parts of xylenoxyethyl butyl phthalate, 100 parts of a medium molecular weight, calendering grade resin marketed as "Geon 103EP" (a medium molecular weight calendering grade homopolymer of polyvinyl chloride, marketed by B. F. Goodrich Chemical Company, having a specific viscosity of approximately 0.38, which is described in the publication "Service Bulletin G-10," published March 1952, by B. F. Goodrich Chemical Company; see also Modern Plastics Encyclopedia, 1957), 2 parts of a barium-cadmium stabilizer and 0.25 part stearic acid were milled on a rolling mill for 5 minutes at 310° F. The composition was sheeted off at a thickness of 0.010 inch resulting in a highly flexible sheet of excellent clarity and brilliance. 1" x 4" specimens obtained from the sheet were suspended in a solution of kerosene dyed to a deep purple color with 0.1% Du Pont Oil Brown. A specimen was removed from the solution after 1, 4, 8, 24 and 96 hours. It was dried with blotting paper and wiped to remove excess kerosene. Upon examination, the film appeared virtually unchanged and even the 4 day specimen had absorbed practically no color. A specimen prepared in an identical manner, with the exception that diisooctyl phthalate was used as a plasticizer, absorbed color readily and turned a deep rose within 24 hours. The specimens containing xylenoxyethyl butyl phthalate retained their original flexibility whereas those containing diisooctyl phthalate became stiff and brittle.

EXAMPLE 7

100 parts of a vinyl chloride-vinyl acetate copolymer containing 3% vinyl acetate, 58 parts of di-sec. butyl-phenoxyethyl butyl phthalate, 3 parts of epoxidized soyabean oil, 3 parts of a cadmium stabilizer, 0.5 part of a phosphite chelator and 0.2 part of stearic acid were mixed by a mechanical kitchen mixer until a dry, fluffy powder was obtained. The composition was milled for 5 minutes at 300° F. on a two-roll mill. It was sheeted off at 0.075 inch and molded for 3 minutes at 345° F. and 1000 lbs. per square inch in an ASTM 6" x 6" x 0.075" four cavity mold. Upon cooling, clear moldings were obtained having excellent clarity, transparency and flexibility. A dumbbell specimen was determined to have a tensile strength of 2400 p.s.i., a modulus at 100% elongation of 1400 p.s.i. and an ultimate elongation of 380%.

EXAMPLE 8

100 parts of a high molecular weight, electrical grade polyvinyl chloride, 55 parts of xylenoxyethyl tridecyloxyethyl phthalate, 10 parts clay, 0.5 part of basic lead sulfate and 0.2 part of mineral oil were milled for 10 minutes at 325° F. Specimens were aged in a mechanical convection oven for 7 days at 136° C. At the end of this time, they were found to have lost 3.2% of their original weight and retained 95% of their original elongation. Similar specimens prepared with diisodecyl phthalate were found to have lost 22% of their original weight and retained none of their original elongation.

EXAMPLE 9

100 parts of a medium molecular weight, calendering grade polyvinyl chloride resin were mixed with 32 parts of a high molecular weight polymeric plasticizer marketed as Paraplex G-25 (a polymeric plasticizer of the alkyd type based on a long chain polybasic acid esterified with a polyhydric alcohol, and marketed by Rohm and Haas Company, having a molecular weight of approximately 8,000, a viscosity of 1,700 poises, and a refractive index of 1.470, and described in the publication, "Synthetic Resins for Coatings," published by Rohm and Haas Company, 1953), 8 parts dixylenoxyethyl phthalate, 2 parts dibasic lead silicate and 0.5 part of a dispersible carbon black. The mixture was milled on a two speed differential mill at 300° F. Within 60 seconds the composition fluxed and banded sufficiently on the mill to permit normal working and complete fusion. An equivalent composition containing 40 parts of Paraplex G-25 alone reached the same state of flux only after 120 seconds under otherwise identical conditions.

EXAMPLE 10

100 parts of a low molecular weight, easy processing polyvinyl chloride resin was fused with 50 parts of a plasticizer mixture consisting of sec. butyl-phenoxyethyl phenoxyethyl phthalate and a low cost extender plasticizer—didodecylbenzene, in the presence of 2 parts of barium-cadmium stabilizer. Following the milling operation, moldings were prepared as described in Example 7. The plasticizer mixture was varied so as to increase the proportion of di-dodecylbenzene in subsequent batches. Other specimens were prepared wherein di-2-ethylhexyl phthalate and di-isodecyl phthalate were used respectively in place of the alkaryloxyethyl compound. When the moldings had been prepared, 1" x 6" x 0.075" strips were cut out and folded over into a loop. The loop was clamped into a special bar leaving only ¾" from the loop at its sharpest bend to the bar uncompressed. The looped specimens were examined after 24 hours at room temperature. Where no exudation, i.e. beads of liquid plasticizer were found, the plasticizer mixture was considered completely compatible. Where exudation was encountered, the appearance of the exudate was rated as light, moderate and heavy. Any amount of spew was considered to exceed the limit of compatibility. The following was observed:

| Plasticizer composition | Loop spew rating (exudation) |
| --- | --- |
| Di-2-ethylhexyl phthalate 100%–di-dodecyl benzene 0% | None. |
| Di-2-ethylhexyl phthalate 90%–di-dodecyl benzene 10% | None. |
| Di-2-ethylhexyl phthalate 85%–di-dodecyl benzene 15% | Light. |
| Di-2-ethylhexyl phthalate 80%–di-dodecyl benzene 20% | Moderate. |
| Di-2-ethylhexyl phthalate 70%–di-dodecyl benzene 30% | Heavy. |
| Di-isodecyl phthalate 100%–di-dodecyl benzene 0% | None. |
| Di-isodecyl phthalate 90%–di-dodecyl benzene 10% | Moderate. |
| Sec-butyl-phenoxyethyl phenoxyethyl phthalate 100%–di-dodecyl benzene 0% | None. |
| Sec-butyl-phenoxyethyl phenoxyethyl phthalate 90%–di-dodecyl benzene 10% | None. |
| Sec-butyl-phenoxyethyl phenoxyethyl phthalate 80%–di-dodecyl benzene 20% | None. |
| Sec-butyl-phenoxyethyl phenoxyethyl phthalate 70%–di-dodecyl benzene 30% | None. |
| Sec-butyl-phenoxyethyl phenoxyethyl phthalate 65%–di-dodecyl benzene 35% | Light. |

NOTE.—Limit of compatibility of di-dodecyl benzene with—
Di-2-ethylhexyl phthalate—ca. 15%.
Di-isodecyl phthalate—ca. 5%.
Sec. butylphenoxyethyl phenoxyethyl phthalate—ca. 35%.

While preferred embodiments of the invention have been shown and described, it is to be understood that the invention is not confined to the specific compositions and methods herein set forth, and that changes and variations may be made therein without departing from the spirit of the invention, or exceeding the scope of the appended claims.

I claim:
1. Xylenoxyethyl tridecyl phthalate.
2. Xylenoxyethyl butyl phthalate.
3. Xylenoxyethyl decyl phthalate.
4. Sec.-butylphenoxyethyl butoxyethyl phthalate.
5. A plasticized vinyl resin composition comprising a vinyl chloride polymer selected from the group consisting of homopolymers of vinyl chloride and copolymers of vinyl chloride with a monoethylenically unsaturated monomer copolymerizable therewith having incorporated therein as a plasticizer from about 3 to about 200 percent by weight of the vinyl chloride polymer of an ester of an organic dicarboxylic acid having the general formula:

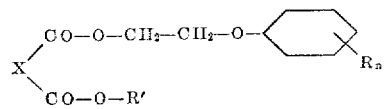

wherein R is a hydrocarbon radical selected from the group consisting of alkyl, aralkyl, aryl, and cycloalkyl radicals, $n$ is an integer from 1 to 3, R' is a member selected from the group consisting of alkyl and alkoxyethyl, and X is a member of the group consisting of alkylene, alkenylene, cycloalkylene, cycloalkenylene, and phenylene.

6. The composition of claim 5 in which the vinyl chloride polymer is polyvinyl chloride.

7. The composition of claim 5 in which the vinyl chloride polymer is a copolymer of vinyl chloride with vinyl acetate.

8. An ester of an organic dicarboxylic acid having the general formula:

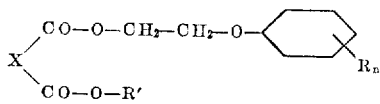

wherein R is a hydrocarbon radical selected from the group consisting of alkyl, aralkyl, aryl, and cycloalkyl radicals, $n$ is an integer from 1 to 3, R' is a member selected from the group consisting of alkyl and alkoxyethyl, and X is a member of the group consisting of alkylene, alkenylene, cycloalkylene, cycloalkenylene, and phenylene.

References Cited in the file of this patent

UNITED STATES PATENTS

| | | |
|---|---|---|
| 2,253,886 | Britton et al. | Aug. 26, 1941 |
| 2,395,581 | Richter | Feb. 26, 1946 |
| 2,687,430 | Snow et al. | Aug. 24, 1954 |
| 2,715,139 | Brandner | Aug. 9, 1955 |
| 2,765,224 | Lambrech | Oct. 2, 1956 |

UNITED STATES PATENT OFFICE
CERTIFICATE OF CORRECTION

Patent No. 3,085,078                      April 9, 1963

Joseph Fath

It is hereby certified that error appears in the above numbered patent requiring correction and that the said Letters Patent should read as corrected below.

Column 4, line 24, for "tridecyloxyethanol, and 2-ethylhexyloxyethanol" read -- methylcyclohexanol, and dimethylcyclohexanol --; column 6, line 49, for "2.5 percent" read -- 25 percent --.

Signed and sealed this 22nd day of October 1963.

(SEAL)
Attest:

ERNEST W. SWIDER
Attesting Officer

EDWIN L. REYNOLDS

Acting Commissioner of Patents